United States Patent

[11] 3,579,205

[72] Inventors Takashi Aga
Akashi-shi;
Masami Yamanaka, Miki-shi, Japan
[21] Appl. No. 855,565
[22] Filed Sept. 5, 1969
[45] Patented May 18, 1971
[73] Assignee Yamato Scale Company, Limited
Akashi-shi, Japan
[32] Priority Nov. 21, 1968
[33] Japan
[31] 43/85,415

[54] PULSE COUNTING DEVICE WITH MEMORY
5 Claims, 12 Drawing Figs.
[52] U.S. Cl. ................................................. 340/173R,
340/149R, 340/173LM
[51] Int. Cl. ................................................. G11c 13/04
[50] Field of Search ........................................... 340/173,
149; 324/111

[56]   References Cited
UNITED STATES PATENTS
3,524,200   8/1970   Humpage .................. 340/149
*Primary Examiner*—Terrell W. Fears
*Attorney*—Eugene E. Geoffrey, Jr.

ABSTRACT: Pulse counting circuit for measuring devices such as scales and the like wherein pulses are produced by motion of the measuring device and fed to a memory element. The memory element produces a second set of pulses which are compared in phase with the original pulses. The phase difference information and pulse count information are used to produce addition and subtraction instruction signals which signals are in turn used to produce a count confirming signal which is fed to the memory element to effect coordination of the original count stored therein with the count confirming signal.

INVENTORS
TAKASHI AGA
MASAMI YAMANAKA
BY
ATTORNEY

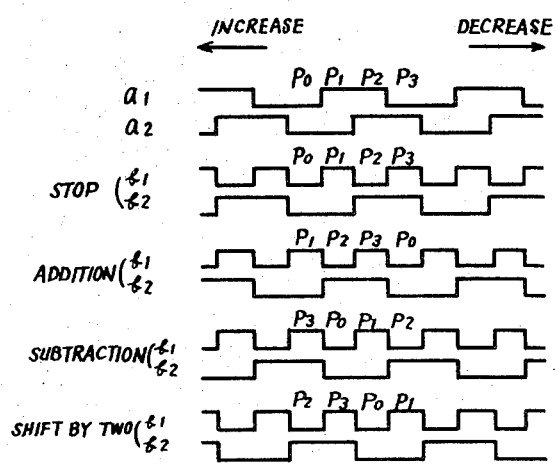
Fig. 10
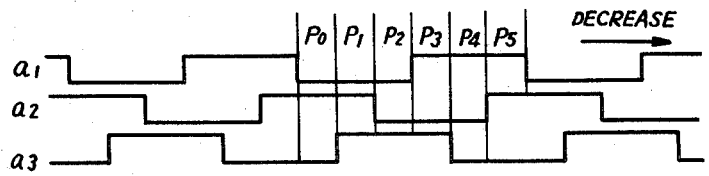
Fig. 11
Fig. 12

PULSE COUNTING DEVICE WITH MEMORY

This invention relates to a pulse-counting device for use in connection with measuring devices such as scales and the like and more specifically provides a novel and improved system for accurately counting pulses and thereby provide a more accurate measurement such as the weight of an article when used in connection with a scale. By means of the novel and improved pulse-counting system the accuracy of the measurement will be relatively unaffected by external noises.

Digital control of balances and scales and digital data processes have become widely used and in the area of weight measurement, the utilization of pulse-counting devices afford one of the simplest solutions with the result that they can be fabricated at a relatively low cost.

However, prior known pulse-counting devices have merely suggested the utilization of pulse-generating means actuated by a weighing mechanism and the number of output pulses were counted to provide a direct indication of weight. These prior known devices have not been found satisfactory as it has been necessary to exercise great care to prevent pulse-counting errors resulting from noises in the counting circuits as well as noises that may be introduced as a result of oscillation of the weighing device before the device comes to rest to produce a weight indication.

This invention overcomes the foregoing disadvantages and provides a novel and improved counting device which effectively prevents pulse-reading errors and will automatically correct an erroneous count even though external noises may have been counted as pulse signals.

The objects of this invention are attained through the utilization of a pulse-counting device which includes a pulse generator actuated by the measuring mechanism such as a balance, scale or the like and which generates at least two sets of pulse signals with the signals of one set displaced in phase from the signals of the other set by a portion of an integer based on the motion of the measuring mechanism produced by a measured unit as for instance a unit of weight. A memory element such as an index register stores the sets of pulse signals and produces a second set of pulse signals having the same phase relation as the first signals. A comparator circuit compares the first and second sets of signals to determine the phase relationship between the two sets. An output circuit produces output signals including a phase count signal and an addition or subtraction signal based on information obtained from the comparator circuit. A counter connected to the output circuit performs addition and subtraction operations of the pulse signals and produces a count confirming signal. The count-confirming signal is applied to the memory element to coordinate the information stored therein. This procedure causes the output signals produced by the memory element to follow in a predetermined manner the original pulse signals immediately after the counting operation and cancel errors produced by noise pulses.

The above and other objects and advantages of the invention will become more apparent from the following description and accompanying drawings forming part of this application.

In the drawings:

FIG. 10 is a graph showing the phase relationships of the pulses in the circuits illustrated in FIGS. 8 and 9;

FIG. 11 shows two charts which further explain the operation of the embodiments shown in FIGS. 8 and 9; and FIG. 12 is a graph showing the phase relationship of pulses in an embodiment of the invention wherein three different pulse signals are produced in the operation of the weighing device.

For simplicity the invention will be described in connection with weighing devices such as a balance, scale, or the like, it being understood, however, that the invention is equally useful for measuring other types of mechanical motion.

Figure 1:
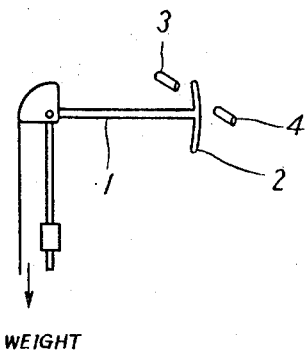
FIG. 1 is a diagrammatic view of a mechanical system for producing pulse signals proportional to a load.
Figure 2:
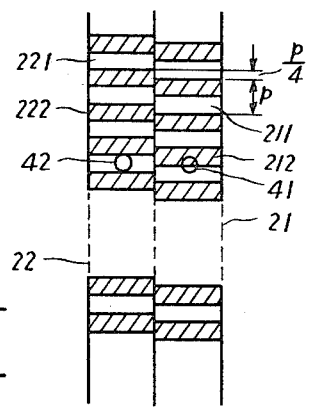
FIG. 2 illustrates one embodiment of a device for producing pulse signals in accordance with the invention.

Referring to FIG. 1, a balance 1 carries a code plate 2 so that the code plate will move in a vertical plane when a weight is applied to the device in the direction of the arrow. A light source 3 is disposed on one side of the code plate 2 and photosensitive devices 4 are positioned on the other side of the code plate. The code plate 2 as illustrated in FIG. 2 has at least two parallel portions which move lengthwise in a vertical plane as a result of movement produced by the balance. Each portion of the code plate has a striped pattern of alternate light transmitting and opaque segments of substantially equal intervals and extending transversely of the portions. The photosensitive devices may comprise any suitable light sensitive device, and each device is coordinated with one of the portions of the code plate 2. Thus as the code plate 2 is moved in a vertical plane two sets of pulses will be produced.

While the code plate may comprise a plurality of portions, for simplicity a code plate having two portions will be discussed. Referring more specifically to FIG. 2, the code plate 2 has two parallel portions 21 and 22. The portion 21 includes light-transmitting segments 211 and opaque segments 212 positioned at substantially equal intervals at a pitch $p$ so that each individual segment has a pitch $p/2$. The portion 22 also includes light-transmitting segments 221 and opaque segments 222 of the same pitch as the segments of the portion 21. However, the segments of the portion 22 are displaced relative to the segments of the portion 21 by one-quarter pitch. The photosensitive elements 41 and 42 are aligned in a direction perpendicular to the motion of the code plate. With the foregoing arrangement the photosensitive elements 41 and 42 generate a pair of pulse signal trains which are displayed by one-quarter pitch as the rod 1 of the balance shown in FIG. 1 oscillates.

Figure 4:
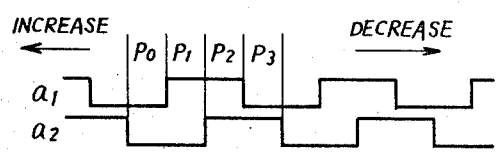
FIG. 4 is a graph illustrating the phase relationship of the pulses produced by the structures shown in FIGS. 1 and 2.
Figure 3:
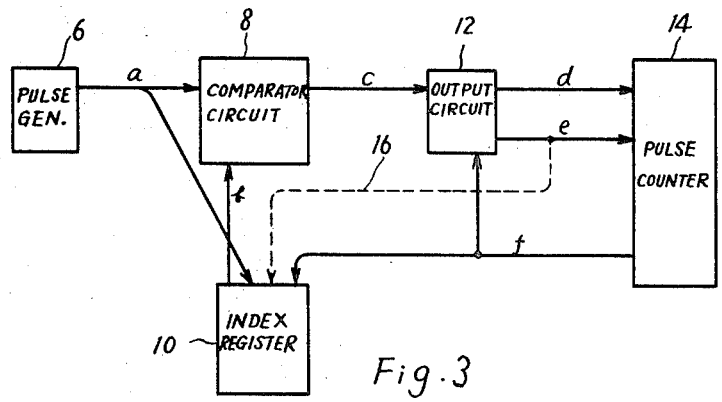
FIG. 3 is a block diagram of a pulse-counting device in accordance with the invention.

FIG. 3 is a block diagram of the apparatus in accordance with the invention and the pulse generator denoted by the numeral 6 includes the photosensitive elements 41 and 42 together with a suitable logic circuit and supplies pulses $a_1$ and $a_2$ (see FIG. 4) having a phase difference of one-quarter period corresponding to the relative displacement of the portions 21 and 22 of the code plate 2. This set of pulse signals is supplied to the comparator circuit 8 and a memory element or index register 10. The mutual relationship of the pulse $a_1$ and $a_2$ is represented by four states $P_0$, $P_1$, $P_2$, and $P_3$ which will be subsequently discussed. The index register 10 follows the states of the weighing pulse signals $a_1$ and $a_2$ and stores these signal states. The index register produces a second set of signals $b_1$ and $b_2$ having a predetermined time delay with respect to signals $a_1$ and $a_2$. This second set of signals is fed to the comparator circuit 8 which compares the phase of the first set of pulse signals $a_1$ and $a_2$ with the phase of the second set of pulse signals $b_1$ and $b_2$. The comparator circuit 8 generates a command signal for commanding an addition or subtraction operation based upon the phase comparison and this command signal is supplied to the output circuit 12. The output circuit 12 produces a pulse count signal $d$ which is to be added or subtracted and an addition or subtraction signal $e$ each time a phase comparison is made and these signals are fed to the pulse counter 14. The output circuit 12 may be arranged to generate either or both addition or subtraction signals depending upon the nature of the pulse counter 14.

The pulse counter 14 performs addition or subtraction operations of the pulse count signal $d$ in accordance with the addition or subtraction signal $e$ and generates a count-confirming signal $f$. The pulse signal $f$ is then supplied to the output circuit 12 and the index register 10. Upon receipt of the count-confirming pulse $f$, the output circuit 12 ceases generation of the count signal $d$. However, the addition or subtraction signal $e$ may be maintained if the occasion demands.

In addition, the index register 10 also receives the count-confirming pulse $f$ and up-dates or coordinates the state of the pulse signals $b_1$ and $b_2$ with the confirming signal $f$. The comparator circuit 8 then compares the state of signals $b_1$ and $b_2$ with the state of the pulse signals $a_1$ and $a_2$. If any further difference is detected between the state of the weighing pulse signals $a_1$ and $a_2$ and the state of the output signals $b_1$ and $b_2$ of the index register 10, the comparator circuit 8 again generates a command signal $c$ and the output circuit 12 in turn generates a new pulse count signal $d$ and an addition or subtraction signal $e$. The counter 14 then executes the necessary operations and produces a new count-confirming signal $f$. It will be observed that the changing relationships between the state of the weighing pulses $a_1$ and $a_2$ and the state of the output pulse $b_1$ and $b_2$ is produced by the direction of sway of the rod 1 and therefore successive addition or subtraction commands will be produced. When the state of $a_1$ and $a_2$ and the state of $b_1$ and $b_2$ stabilize, the rod 1 of the balance will have come to rest and the count produced by the counter 14 will then correspond to the weight placed upon the balance.

If desired, the instruction signal $e$ of the output circuit 12 may be connected as indicated by the broken line 16 to the index register 10 to cause the index register to follow the pulse counter 14. This will be described in greater detail in connection with FIGS. 8 through 11.

An important advantage obtained by this invention resides in the effective elimination of errors which may be produced by noise which enters the input circuit and produces an erroneous count. By reason of the novel and improved circuit arrangement, the erroneous count is effectively cancelled and therefore noise errors are eliminated from the final count. This is attained by having the index register 10 perform the same operation as the pulse counter 14 and then comparing the information stored in the index register and pulse counter.

For example, if an external noise is produced in the system even though there is no change in the state of the weighing pulse signals, the counter 14 will produce a count which includes the noise pulses and will up-date the state of the index register 10. However, since the noise normally terminates within a very short time, the input circuit will have returned to its original state when the noise-counting procedure has been completed. Let it be assumed that the noise produces a difference of one count in the state of the signals $a_1$ and $a_2$ and the state of $b_1$ and $b_2$. The comparator circuit 8 will generate a comparison signal, the output circuit 12 will generate a count signal $d$ and an addition or subtraction signal $e$, and the counter 14 will execute a counting operation opposite to the above in order to restore the count and at the same time cause the information stored in the index register to coincide with the original state of the signals $a_1$ and $a_2$ and thereby correct the erroneous count. Similarly should the code plate 2 of FIG. 1 suddenly reverse its direction of motion as a result of normal oscillation of the balance, a subtraction signal may be produced immediately following an addition signal. This may provide a temporary delay in the operation of the pulse counter 14 since the result of addition is stored in the index register 10 and the subtraction operation will be performed as in the case of an erroneous count to produce a final correct count. When the period of oscillation of the rod 1 is known, a more correct count can be obtained by introducing a delay in the count-confirming signal wherein the time delay would be less than one pulse interval of the input signal.

Figure 5:
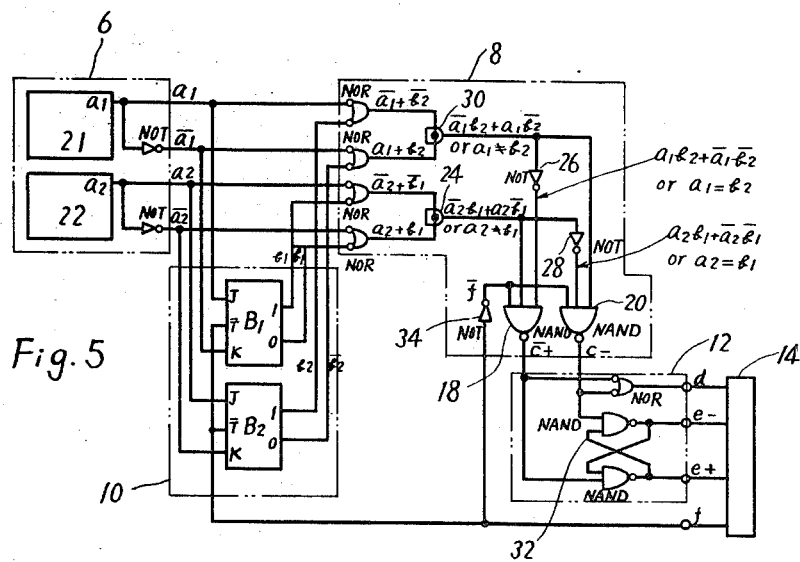
FIG. 5 is a circuit diagram of one embodiment of a pulse-counting device in accordance with the invention.
Figure 6:
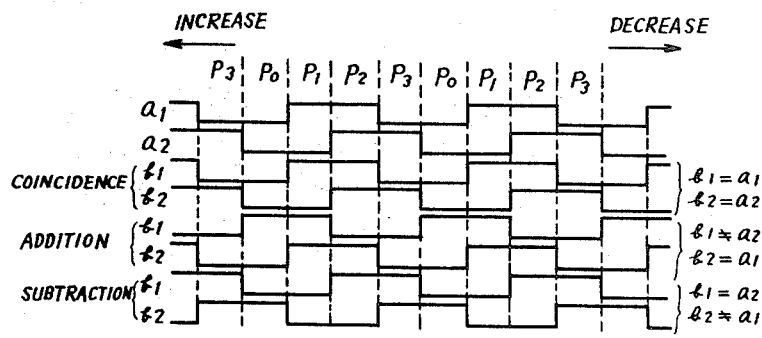
FIG. 6 is a graph showing the relationship of the signals produced by the circuit shown in FIG. 5.

FIG. 5 is a more detailed circuit diagram of the form of the invention shown in FIG. 3 and the operation of the circuit will be more clearly understood by referring to the wave forms illustrated in FIG. 6.

The pulse generator 6 includes the pulse-generating means of FIG. 2. These means are generally denoted by the numerals 21 and 22 and produce weighing pulses $a_1$ and $a_2$. Since these weighing pulses are displaced in phase by a quarter period, four different signal states are produced, namely, $P_0(a_1 0, a_2=0)$, $P_1(a_1 1, a_2=0)$, $P_2(a_1 1, a_2=1)$, and $P_3(a_1 0, a_2=1)$.
For convenience in the following description, the signals $a_1=1$, $a_1=0$, $a_2=1$, and $a_2=0$ will be indicated by the symbols $a_1$, $\bar{a}_1$, $a_2$, and $\bar{a}_2$, respectively.

From FIGS. 5 and 6 it will be observed that the signals $a_1$ and $a_2$ are fed to flip-flops $B_1$ and $B_2$ in the index register 10, and these flip-flops in turn produce pulse signals $b_1$ and $b_2$. The flip-flops are conditioned so that $a_1=b_1$ and $a_2=a_2$ when the state of the weighing pulses $a_1$ and $a_2$ and the state of the output pulses $b_1$ and $b_2$ of the index register 10 coincide with each other. If the code plate 2 is displaced in one direction or the other, the state of the pulse signals $a_1$ and $a_2$ will change. If the code plate moved in a direction requiring addition, then pulses $b_1$ and $b_2$ will be shifted by a quarter period with respect to $a_1$ and $a_2$ and at this time $a_1=b_2$ and $a_2 \neq b_1$. Similarly if subtraction is required, $b_1$ and $b_2$ are shifted in the opposite direction by a quarter period at which time $a_1 \neq b_2$ and $a_2=b_1$. The comparator circuit 8 compares $a_1$ with $b_2$ and $a_2$ with $b_1$ and generates an addition command signal when $a_1=b_2$ and $a_2 \neq b_1$ and a subtraction command when $a_1 \neq b_2$ and $a_2=b_1$.

Figure 7:
FIG. 7 is a chart explaining certain aspects of the operation of the pulse-counting circuit of FIG. 5.

As will be observed in FIG. 7, four different states of signals $a_1$ and $a_2$ each have four different states of the signals $b_1$ and $b_2$ and specific single addition and subtraction conditions may be obtained therefrom by means of the logic circuits forming part of the comparator 8. The output signals of the comparator 8 feed a pair of NAND circuits 18 and 20 at the input of the output circuit 12. Furthermore, a signal from the AND circuit 24 of the comparator 8 representing $a_2=b_1$, a signal from the NOT circuit 26 representing $a_1=b_2$ and $\bar{f}$ from the pulse counter 14 are fed to the input terminal of the NAND circuit 18 and a signal from the NOT circuit 28 representing $a_2=b_1$, a signal from the AND circuit 30 and $\bar{f}$ are supplied to the input terminal NAND circuit 20. Since $\bar{f}$ equals 1 when a count-confirming signal $f$ is not generated, an output signal $\bar{c}+$ of the NAND circuit 18 and $\bar{c}-$ of the NAND circuit 20 is determined by the respective output signals of the AND circuit 24, the NOT circuit 26, AND circuit 30, and NOT circuit 28 and produces the following addition and subtraction conditions:

When the addition condition is fulfilled, $$\bar{c}+ = 0 \rightarrow \begin{cases} d=1 \\ e+=1 \end{cases}$$

and when the subtraction condition is fulfilled, $$\bar{c}- = 0 \rightarrow \begin{cases} d=1 \\ e-=1 \end{cases}$$

When the addition signal $e+=1$ is generated by the addition condition, this state will be maintained until a subtraction signal $e-=1$ is generated by the subtraction condition. This is accomplished in the output circuit 12 which includes R-S flip-flop 32 which stores the signals $e+$ and $e-$. Thus $e-=1$ state will be maintained in the flip-flop 32 until an $e+$ signal is produced.

When a count signal $d$ is supplied to the counter 14, the counter executes a counting operation and generates a count confirming signal $f$. The signal $f$ is inverted in the NOT circuit 34 and is supplied to the NAND circuits 18 and 20. The inverted signal $\bar{f}$ causes both $\bar{c}+$ and $\bar{c}-$ to become 1 and resets the count signal $d$ to 0. At the same time signals $e+$ and $e-$ remain unchanged. Since the count-confirming signal $f$ is reset upon completion of the counting operation of the counter 14, the state of the output circuit 12 will return to its original state and the states of flip-flops $B_1$ and $B_2$ of the index register 10 will vary to coordinate with the states of the weighing pulses $a_1$ and $a_2$ at the instant the count-confirming signal is generated.

The logic formulas of $\bar{c}+$ and $\bar{c}-$ are as follows:

$$\bar{c}+ = \overline{f(a_1b_2+\overline{a_1}\overline{b_2})(\overline{a_2}b_1+a_2\overline{b_1})}$$

$$\bar{c}- = \overline{f(\overline{a_1}b_2+a_1\overline{b_2})(a_2\overline{b_1}+\overline{a_2}b_1)}$$

$$d = \overline{f}(a_1b_2+\overline{a_1}\overline{b_2})(a_2\overline{b_1}+\overline{a_2}b_1) + (a_2b_1+\overline{a_2}\overline{b_1})(a_1\overline{b_2}+\overline{a_1}b_2)$$

The substantial elimination of the effect of external noises is effected in the following manner. Referring to FIG. 6, for example, if the weighing pulse signals $a_1$ and $a_2$ remain in the state $P_1$, the contents of the index register 10 will also remain in the state $P_1$ and no counting operation will be produced. If noise is produced which causes both signals $a_1$ and $a_2$ to simultaneously equal 1, a state is produced which is essentially the same as the state $P_2$. However, since the contents of the index register are in the state $P_1$, the relationship of the two sets of pulses becomes $a_1 \neq b_2$ and $a_2 = b_1$. This will cause the generation of a subtraction pulse by the output circuit 12 and the counter 14 will subtract one pulse and generate a count-confirming signal $f$. The output $b_1$ and $b_2$ of the index register 10 will be up-dated to state $P_2$ by the count-confirming signal $f$ and $a_1$ and $a_2$ will again be restored to the original state $P_1$ since the noise will have already disappeared. At this time $a_1 = b_2$ and $a_2 \neq b_1$ so that an addition signal will be generated by the output circuit 12. The counter 14 will then add one pulse to cancel the subtraction resulting from the noise and the outputs $b_1$ and $b_2$ of the index register 10 will return to the state $P_1$.

Under the condition wherein a noise pulse occurs causing $a_1$ and $a_2$ to become equal to 1 when the device has attained the final state $P_3$, a condition wherein $a_1 = b_2$ and $a_2 \neq b_1$ is produced and an addition of one pulse is performed. Upon disappearance of the noise, a condition occurs wherein $a_1 = b_2$ and $a_2 \neq b_1$ and this condition corrects the error by causing subtraction of one pulse.

It is evident from the foregoing description that even if noise occurs in the input portion of the device and is counted, the erroneous count is always cancelled and the counter 14 will count only the pulse signals corresponding to the measured value. The code plate 2 in swinging vertically when an article is placed on the balance or scale causes repeated changes in the relationship between the weighing pulses $a_1$ and $a_2$ and the output pulses $b_1$ and $b_2$ and results in repeated addition and subtraction operations. However, the count is repeatedly corrected each time the code plate 2 reverses its direction of movement until the code plate comes to rest. At such time the weighing pulses $a_1$ and $a_2$ will coincide with the output pulses $b_1$ and $b_2$ of the index register and an accurate count will be obtained.

Figure 8:
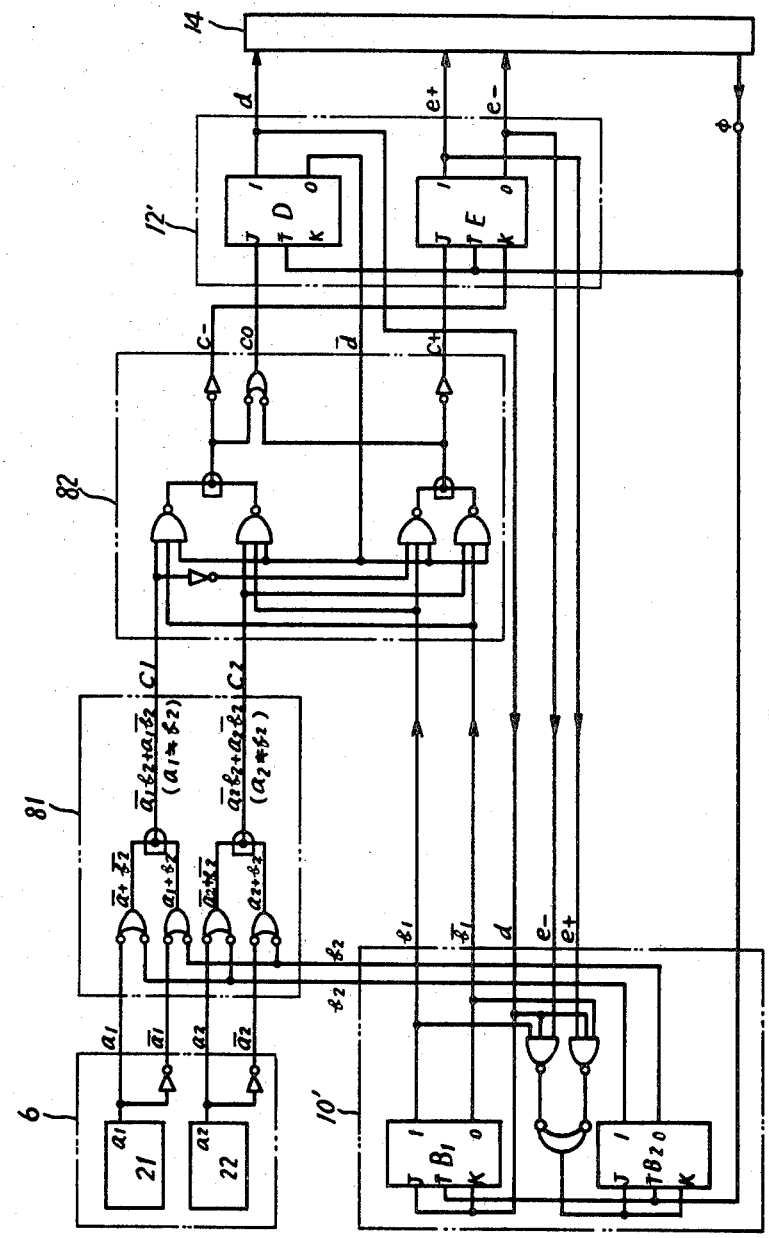
FIG. 8 is a circuit diagram of a modified embodiment of a pulse-counting device in accordance with the invention.

FIG. 8 illustrates a modified embodiment of the invention affording improved means for cancellation of noise pulses, and FIGS. 10 and 11 are explanatory pulse diagrams and tables to facilitate an understanding of the operation thereof.

While this embodiment of the invention is more complicated than the embodiment illustrated in FIG. 5, the following features afford increased accuracy:

1. The noise signal of the index register 10' of FIG. 8 is derived from either an addition or subtraction signal supplied to the pulse counter 14 as shown by the dotted line 16 in FIG. 3. In this way variations of the output of the index register are identical to the count produced by pulse counter 14. Furthermore, since the signals $d$ and $e$ are produced by comparing the output of the index register 10' with the input weighing pulses, the resultant count is more accurate.
2. Since all of the circuit operations are controlled by a clock pulse $\phi$ produced by the pulse counter 14, increased circuit stability and reduced effects of noise are attained.

In the circuit of FIG. 5, if a noise signal causes both $a_1$ and $a_2$ to equal 1 when both the weighing pulse signals and the output signals of the index register are in the state $P_1$, the signals $a_1$ and $a_2$ are caused to assume the state $P_2$ whereupon a subtraction signal is generated and ultimately effects a subtraction operation whereupon the index register is up-dated to the state $P_2$. However, if the code plate 2 of the balance moves in a direction requiring addition while the pulse counter 14 is counting pulses resulting from noises and counting of the noise signals is completed by the time the counting of the weighing pulses is completed, two shifts will be required by the weighing pulse $a_1$ and $a_2$ and the output pulses $b_1$ and $b_2$. In this case the comparator circuit 8 will not be able to operate. Now should the code plate move further in the addition direction and the pulse signals $a_1$ and $a_2$ are transferred to the state $P_3$ then the relationship between states $P_3$ and $P_2$ will result in a subtraction so that a subtraction signal will be produced to cause the pulse counter 14 to further subtract 1 and up-date the index register 10 to the state $P_3$ whereupon the operation will terminate. In this case even though the weight has practically increased by an amount corresponding to two pulses, the pulse counter 14 will effect subtraction of two pulses and thereby produce an error of four pulses in the output reading.

With the embodiment of the invention shown in FIG. 8, the foregoing disadvantages are overcome. For example, if the weighing pulses $a_1$ and $a_2$ and the output pulses of the index register 10' are shifted one relative to the other by two states, namely, $P_0$ and $P_2$ or $P_1$ and $P_3$, a count signal $d$ will be produced to cause the counter to operate so that an addition or subtraction signal will be produced which is opposite to the latest instruction signal. This will result in an addition operation in the state $P_0$ of $a_1$ and $a_2$ and in the state $P_2$ of $b_1$ and $b_2$ after the disappearance of the noise even when an erroneous count was produced by the noise. Therefore, $a_1$ and $a_2$ will remain in the state $P_0$ while $b_1$ and $b_2$ will attain state $P_a$. As a result, an addition signal will be produced to cause $a_1, a_2, b_1$ and $b_2$ to attain the state $P_0$ whereupon the operation is completed. If the speed of operation of the circuit and the pulse counter 14 is high in comparison to the frequency of the input count pulses, erroneous counts should not occur as long as the noise produced in the input circle is of relatively short duration.

More specifically, the pulse signals $a_1$ and $a_2$ of the pulse generator 6 and the output signals $b_1$ and $b_2$ of the index register 10' are compared in a first comparator circuit 81 to produce two signals $c_1(a_1 \neq b_2)$ and $c_2(a_2 \neq b_1)$ an apply them to a second comparator circuit 82. The output of the second comparator circuit 82 is $d=0$. That is, it is always 0 when the count signal is produced. In this case, the following conditions obtain as will be more clearly understood with reference to FIG. 11:

a. When the state of $a_1$ and $a_2$ advances by 1 or 2 from the state of $b_1$ and $b_2$, ($b_1$ and $b_2$ correspond to "addition" or "shift by 2" as illustrated in FIG. 10) then $c+=1$.
b. When the state of $a_1$ and $a_2$ is delayed by 1 or 2 from the state of $b_1$ and $b_2$ ($b_1$ and $b_2$ correspond to "subtraction" or "shift by 2" as illustrated in FIG. 10) then $c-=1$.
c. When the state of $a_1$ and $a_2$ and the state of $b_1$ and $b_2$ are not in coincidence with each other as in the above conditions ($a$) or ($b$), then $c_0=1$.

The clock pulse $\phi$ is supplied by the pulse counter 14 to flip-flops D and E in the output circuit 12' and to the flip-flops $B_1$ and $B_2$ in the index register 10This functions to invert the four flip-flops in response to the input condition of the input terminal J or K of each flip-flop.

The index register 10' then executes an operation of "advance by 1 pulse" or "delay by 1 pulse" depending on whether the output $e+$ or $e-$ of the flip-flop E becomes 1 when the counter signal $d$ becomes 1. In addition, the flip-flop $B_1$ operates every time and the flip-flop $B_2$ operates at the time of addition with $\bar{b}_1$ and at the time of subtraction with $b_1$. This is shown clearly in FIG. 10.

To summarize, the operation of the circuit is as follows:

i. When the state of $a_1$ and $a_2$ coincides with the state $b_1$ and $b_2$, then $c_0=0$. Since $d=0$ even at the time of a clock pulse $\phi$ operation of the respective portions will not occur.
ii. When the state of $a_1$ and $a_2$ advances by 1 from the state of $b_1$ and $b_2$, then $c_0=1$, $c+=1$, and $c-=0$. Thus the counter 14 will execute addition in response to the next clock pulse $\phi$ since $d=1$, $e+=0$, and $e-=0$ are provided by the clock pulse $\phi$ whereupon the output signals of the index register 10' are increased by 1.

iii. When the state of $a_1$ and $a_2$ is delayed by 1 from the state $b_1$ and $b_2$, then $c_0=1$, $c+=0$, and $c-=1$. Thus as in the case of (ii), $d=1$, $e+=0$, and $e-=1$ are provided by the clock pulse $\phi$ and the counter executes a subtraction operation in response to the next clock pulse $\phi$ and the output signals of the index register 10' are decreased by 1.

iv. When the state of $a_1$ and $a_2$ shifts by 2 from the state of $b_1$ and $b_2$, then $c_0=1$, $c+=1$, and $c-=1$. As a result $d=1$ is provided by the clock pulse $\phi$ and $e+$ and $e-$ are inverted. Accordingly upon receipt of the next clock pulse $\phi$ a subtraction operation is executed if an addition operation had been previously executed and addition operation is executed if a subtraction operation had been previously executed.

Figure 9:
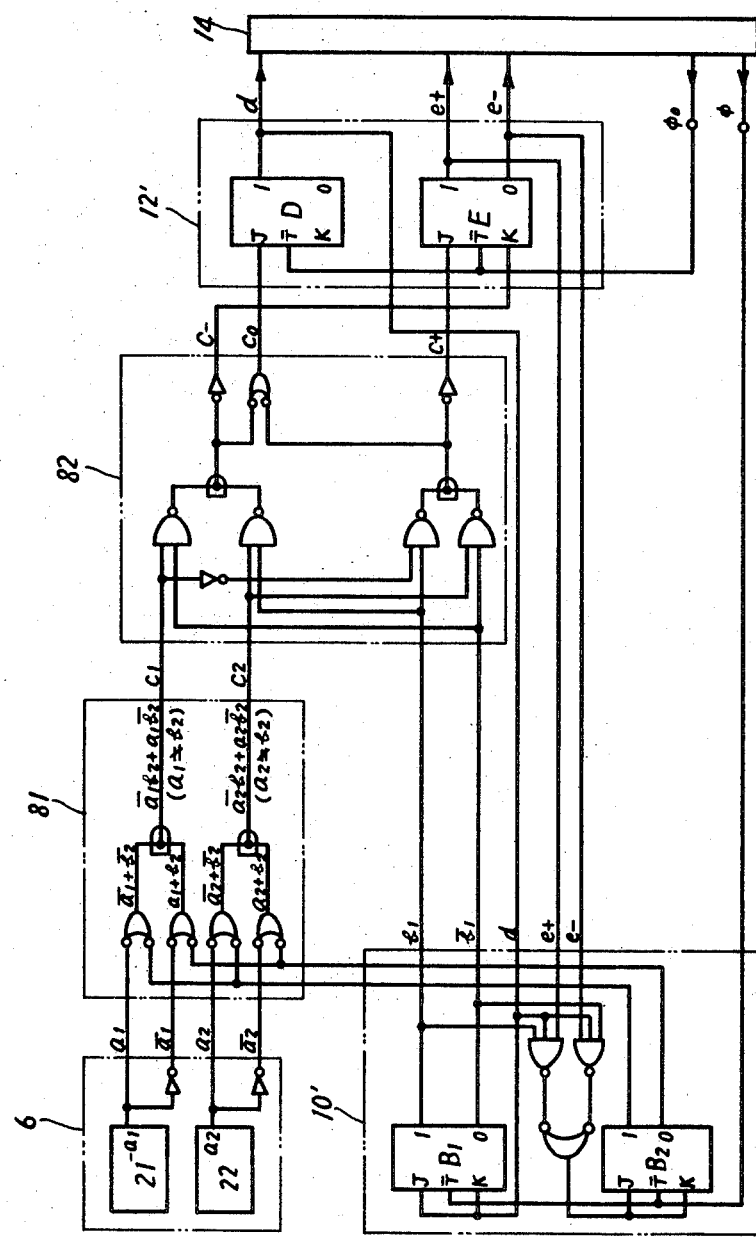
FIG. 9 is still another embodiment of a pulse-counting device in accordance with the invention.

Though the addition or subtraction of one pulse is executed with two clock pulses in the embodiment of FIG. 8, the embodiment of FIG. 9 is arranged to perform addition or subtraction with one clock pulse.

More specifically and with reference to FIG. 9, an auxiliary clock pulse $\phi_0$ is generated at a point in time earlier than the clock pulse $\phi$ which initiates counting and is supplied to the flip-flops D and E of the output circuit 12' to remove the signal $\bar{d}$ from the circuit 82. With this circuit signals are fed to the output circuit 12' by the auxiliary clock pulse $\phi_0$ and the addition or subtraction command pulse is fed by the clock pulse $\phi$ to the pulse counter 14 and the index register 10'. In this way it is possible to execute an addition or subtraction of one pulse within one cycle of the clock pulse $\phi$ and thereby double the speed of counting.

The embodiments of the invention as described above utilize two weighing pulses $a_1$ and $a_2$. However, it is possible to provide for six different states $P_0$, $P_1$, $P_2$, ... $P_5$ if three weighing pulses $a_1$, and $a_2$, and $a_3$ are provided with each of the pulses being shifted by one-third of a period from each other as shown in FIG. 12. This can be obtained by using a code plate divided into three portions and utilizing three photosensitive elements whereupon one pitch on the code plate will produce six pulses. With this arrangement six times the accuracy can be obtained by a code plate having the same length as the code plate previously described. Furthermore, even when the state of the weighing pulse signals may shift by two or three steps from the contents of the index register, the circuit will nevertheless afford this improved accuracy.

As evident from the foregoing description, the pulse-counting device in accordance with the invention will function to cancel automatically an erroneous count caused by noise even when the noise pulses have entered the circuit in the low voltage input portion and have been counted as pulses, the accurate count is obtained immediately upon the disappearance of the noise. Furthermore, since one pitch of the code plate corresponds to four pulses (six pulses when using the structure described in connection with FIG. 12), the desired pulses can be obtained by a code plate of only one-quarter of the length of code plates according to the prior art, and therefore, the accuracy can be increased up to four times by the use of code plates of the same length of those used in prior art structures. Furthermore, if the accuracy is to be maintained constant, it is possible to reduce the oscillation of the balancing device of the balance to reduce the weighing time.

It is evident from the foregoing description that the pulse-counting device according to this invention exhibits superior operational effects when used in a device for indicating a measured value in digital form by counting pulses. It is also readily applicable for use in a device for detecting the weighed value of a balance and indicating the detected value in digital form and in various devices for measuring degree of displacement.

We claim:

1. A pulse-counting device for measuring devices such as scales and the like comprising means for generating at least two primary sets of electrical pulses having a phase difference less than one integer in response to movement of said measuring device, a memory element connected with said generating means and storing said sets of pulses and producing at least two secondary sets of pulses having the same phase relationship as said primary sets of pulses, a comparator connected to said generator and said memory element to compare the phase difference between said primary and secondary sets of pulses and produce phase difference and pulse count instruction signals, an output circuit connected to said comparator and producing a pulse count signal and addition and subtraction signals in accordance with said phase difference instruction signal, a pulse counter connected to said output circuit to count said pulses, effect addition and subtraction operations all produce a count-confirming signal, and a connection between said pulse counter and said memory element for feeding said count-confirming signal to said memory element whereby the information stored in said memory element will be caused to correspond to the measurement pulse signals immediately upon completion of the counting operation.

2. A pulse-counting device according to claim 1 wherein said memory element is an index register including a plurality of flip-flops with the number of flip-flops corresponding to the number of measurement pulse signals.

3. A pulse-counting device according to claim 1 including a connection between said memory element and said output circuit to feed the addition and subtraction signals to said memory element and said pulse counter generates a clock pulse and feeds it to said memory element to cause said memory element to coordinate the information stored therein with the pulse count information produced by said pulse counter.

4. A pulse-counting device according to claim 1 wherein said pulse counter produces a clock pulse and an auxiliary clock pulse leading in phase said first clock pulse and said device includes a connection between said pulse counter and said output circuit, the last said connection feeding said auxiliary clock pulse to said output circuit to control the operation thereof and the first said clock pulse being fed to said memory element to effect coordination of the stored pulse count with the pulse count information produced by said pulse counter.

5. A pulse-counting device according to claim 1 including a code plate formed of at least two portions each having alternate light transmitting and opaque stripes, a light source directing light onto one face of said code plate, and at least two photosensitive elements each associated with one of said portions of said code plate, the stripes on said portions and said photosensitive elements being positioned to produce two sets of pulses with one set of pulses displaced in phase relative to the other set of pulses.